(12) United States Patent
Smith et al.

(10) Patent No.: US 6,704,827 B1
(45) Date of Patent: Mar. 9, 2004

(54) HOT PLUG INTERFACE (HPI) TEST FIXTURE

(75) Inventors: Kevin G. Smith, Campbell, CA (US); Ross Hamilton, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 516 days.

(21) Appl. No.: 09/802,247

(22) Filed: Mar. 8, 2001

(51) Int. Cl.$^7$ .................. G06F 13/10; G06F 11/22; G06F 19/00; G01R 31/28
(52) U.S. Cl. ............... 710/302; 379/21; 714/25; 702/108
(58) Field of Search ............... 710/301, 302, 710/313, 304; 379/21, 19, 1.01, 22.06; 714/724, 42, 718, 44, 39, 40, 25, 47; 702/122, 120, 108; 703/21, 28; 439/482; 361/683; 307/125

(56) References Cited

U.S. PATENT DOCUMENTS

| | | | |
|---|---|---|---|
| 4,999,787 A | * | 3/1991 | McNally et al. |
| 5,791,934 A | * | 8/1998 | Hatley et al. |
| 6,343,266 B1 | * | 1/2002 | Paul et al. |
| 6,421,798 B1 | * | 7/2002 | Lin et al. |
| 6,505,317 B1 | * | 1/2003 | Smith et al. |

OTHER PUBLICATIONS

The 'Logic assurance (LA)' system–a tool for test and controlling real–time systems by Shtrichman, O; Goldring, R. (abstract only).*

* cited by examiner

*Primary Examiner*—Gopal C. Ray
(74) *Attorney, Agent, or Firm*—Meyertons Hood Kivlin Kowert & Goetzel, P.C.; B. Noël Kivlin

(57) ABSTRACT

A method is provided, the method comprising testing at least one hot-pluggable peripheral hardware device and a computer system by simulating hot-plugging the at least one hot-pluggable peripheral hardware device using a test fixture inserted between the computer system and the at least one hot-pluggable peripheral hardware device. The method also comprises monitoring at least one effect of testing the at least one hot-pluggable peripheral hardware device and the computer system.

30 Claims, 13 Drawing Sheets

HOT PLUG INTERFACE (HPI) TEST FIXTURE

BACKGROUND OF THE INVENTION

1. Field of the Invention

This invention relates generally to computer hardware and software and, more particularly, to a method and a device for testing hardware and software compatibilities and interactions.

2. Description of Related Art

The ability to add and remove devices to a computer and/or a computer system while the computer and/or computer system is running and have the operating system automatically recognize the change is known as "hot plugging" or "hot swapping." At least two conventional external bus standards, the Universal Serial Bus (USB) standard and the IEEE1394 or FireWire® standard, support hot plugging. Hot plugging is also a feature of the Personal Computer Memory Card International Association (PCMCIA) standard. Hot plugging may also be used with some Small Computer System Interface (SCSI) devices.

The Universal Serial Bus (USB) standard is an external bus standard that supports data transfer rates of 1.2 and 12 million bits per second (1.2 Mbps and 12 Mbps). A single Universal Serial Bus (USB) port can be used to connect up to 127 peripheral devices, such as mice, modems, keyboards and the like. The Universal Serial Bus (USB) standard also supports plug-and-play installation. Starting in 1996, a few computer manufacturers included Universal Serial Bus (USB) support in their new machines. However, with the release of the Apple's best-selling iMac® in 1998, Universal Serial Bus (USB) support became widespread. Universal Serial Bus (USB) support is expected to completely replace serial and parallel ports.

The IEEE1394 or FireWire® standard is an external bus standard that supports data transfer rates of 400 million bits per second (400 Mbps). Products supporting the IEEE1394 standard go under different names, depending on the company. Apple, which originally developed the technology, uses the trademarked name FireWire®. Other companies use other names, such as i.link and Lynx, to describe their IEEE1394 products.

There is a constant drive within the computer industry to verify software's ability to work with peripheral hardware devices. In particular, there is often a need to verify software's ability to work with at least one hot-pluggable peripheral hardware device that connects to a computer and/or a computer system via hot-pluggable interfaces such as those supporting the Universal Serial Bus (USB) standard, the IEEE1394 or FireWire® standard and the like. Conventionally, software engineers have manually plugged, unplugged and replugged a Universal Serial Bus (USB) device (or a string or chain of such devices), for example, repeatedly, attempting to discover software problems such as memory leaks, failed and/or intermittent enumerations of the bus, interactions with problematic devices and the like. However, human errors inevitably limit the usefulness, robustness and reliability of such manual testing. For example, such manual plugging may not be performed at sufficiently regular intervals and/or may not be able to be performed for extended periods of time.

Conventional attempts to automate the plugging and unplugging of a Universal Serial Bus (USB) device (or a string or chain of such devices), for example, have not permitted the plugging and unplugging to be performed at easily variable intervals. Moreover, such attempts have not provided for the power connections of the Universal Serial Bus (USB) device (or a string or chain of such devices) to be enabled prior to the data connections of the Universal Serial Bus (USB) device (or a string or chain of such devices) to emulate the design of the Universal Serial Bus (USB) cable connectors. In addition, such attempts have not provided for automated monitoring of the plugging and unplugging of the Universal Serial Bus (USB) device (or a string or chain of such devices).

The present invention is directed to overcoming, or at least reducing the effects of, one or more of the problems set forth above.

SUMMARY OF THE INVENTION

In one aspect of the present invention, a method is provided, the method comprising testing at least one hot-pluggable peripheral hardware device and a computer system by simulating hot-plugging the at least one hot-pluggable peripheral hardware device using a test fixture inserted between the computer system and the at least one hot-pluggable peripheral hardware device. The method also comprises monitoring at least one effect of testing the at least one hot-pluggable peripheral hardware device and the computer system.

In another aspect of the present invention, a system is provided, the system comprising a computer system and at least one hot-pluggable peripheral hardware device. The system also comprises a test fixture capable of testing the at least one hot-pluggable peripheral hardware device and the computer system by simulating hot-plugging the at least one hot-pluggable peripheral hardware device using the test fixture inserted between the computer system and the at least one hot-pluggable peripheral hardware device and a monitor capable of monitoring at least one effect of testing the at least one hot-pluggable peripheral hardware device and the computer system.

In yet another aspect of the present invention, a device is provided, the device comprising means for testing at least one hot-pluggable peripheral hardware device and a computer system by simulating hot-plugging the at least one hot-pluggable peripheral hardware device using a test fixture inserted between the computer system and the at least one hot-pluggable peripheral hardware device. The device also comprises means for monitoring at least one effect of testing the at least one hot-pluggable peripheral hardware device and the computer system.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
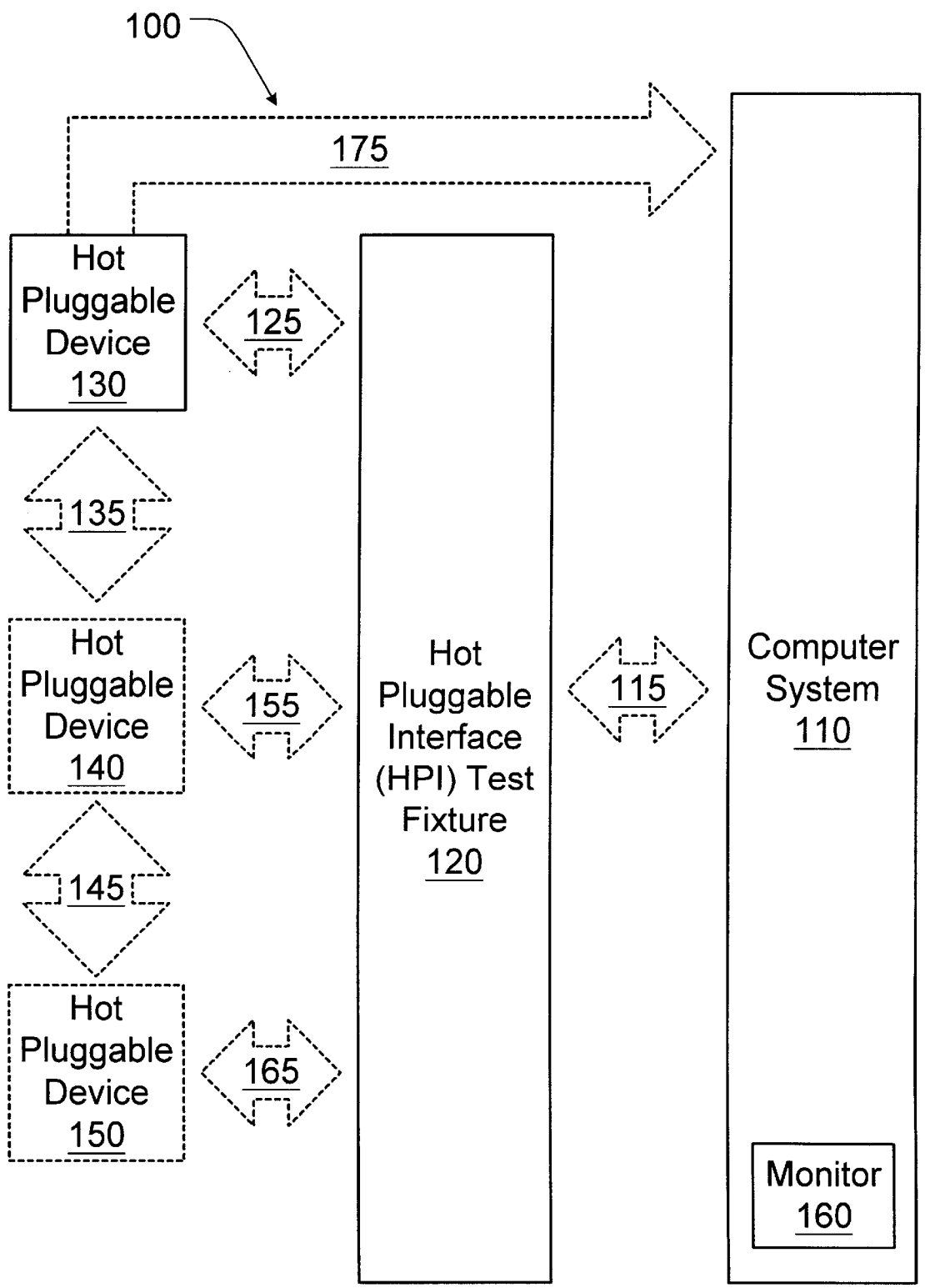
FIGS. 1–3 schematically illustrate various embodiments of a device and a system according to the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Illustrative embodiments of a method and device according to the present invention are shown in FIGS. 1–13. As shown in FIG. 1, a system 100 may comprise a computer system 110, a hot-pluggable interface (HPI) test fixture 120 and a hot-pluggable peripheral hardware device 130. The computer system 110 and the hot-pluggable interface (HPI) test fixture 120 may communicate via bus 115 (shown in phantom). The hot-pluggable interface (HPI) test fixture 120 and the hot-pluggable peripheral hardware device 130 may communicate via bus 125 (shown in phantom). The computer system 110 and the hot-pluggable peripheral hardware device 130 may also optionally communicate via bus 175 (shown in phantom).

Alternatively, and/or additionally, in various alternative illustrative embodiments, the system 100 may further comprise hot-pluggable peripheral hardware devices 140 and 150 (shown in phantom). The hot-pluggable peripheral hardware devices 130, 140 and 150 may be a chain strung together by buses 135 and 145 (shown in phantom). In various other alternative illustrative embodiments, the hot-pluggable peripheral hardware devices 130, 140 and 150 may communicate individually with the hot-pluggable interface (HPI) test fixture 120 via respective buses 125, 155 and 165 (shown in phantom). In still other alternative illustrative embodiments, the hot-pluggable peripheral hardware devices 130, 140 and 150 may communicate individually with the hot-pluggable interface (HPI) test fixture 120 via respective buses 125, 155 and 165 and may also communicate as a chain strung together by buses 135 and 145.

Alternatively, and/or additionally, in various alternative illustrative embodiments, the hot-pluggable interface (HPI) test fixture 120 may be inserted between the hot-pluggable peripheral hardware devices 130, 140 and 150 instead of being inserted between the computer system 110 and the hot-pluggable peripheral hardware devices 130, 140 and 150. For example, as shown in FIG. 1, the hot-pluggable interface (HPI) test fixture 120 may be inserted between the hot-pluggable peripheral hardware devices 130 and 140, using the respective buses 155, 125 and 175, and not using the bus 115. Similarly, the hot-pluggable interface (HPI) test fixture 120 may be inserted between the hot-pluggable peripheral hardware devices 140 and 150, using the respective buses 165 and 155, and not using the bus 115.

The hot-pluggable peripheral hardware devices 130, 140 and 150, in various illustrative embodiments, may be a Universal Serial Bus (USB) device that conforms to the Universal Serial Bus (USB) standard. The hot-pluggable peripheral hardware devices 130, 140 and 150, in various alternative illustrative embodiments, may be an IEEE1394 or FireWire® device that conforms to the IEEE1394 or FireWire® standard.

In various illustrative embodiments, the hot-pluggable interface (HPI) test fixture 120 is capable of testing the hot-pluggable peripheral hardware device 130 by simulating hot-plugging the hot-pluggable peripheral hardware devices 130. In various alternative illustrative embodiments, the hot-pluggable interface (HPI) test fixture 120 is capable of testing a chain of the hot-pluggable peripheral hardware devices 130, 140 and 150 by simulating hot-plugging the chain of the hot-pluggable peripheral hardware devices 130, 140 and 150.

In various other alternative illustrative embodiments, the hot-pluggable interface (HPI) test fixture 120 is capable of testing a plurality of the hot-pluggable peripheral hardware devices 130, 140 and 150 by simulating hot-plugging the plurality of the hot-pluggable peripheral hardware devices 130, 140 and 150. In still other alternative illustrative embodiments, the hot-pluggable interface (HPI) test fixture 120 is capable of testing a chain of the plurality of the hot-pluggable peripheral hardware devices 130, 140 and 150 by simulating hot-plugging the chain of the plurality of the hot-pluggable peripheral hardware devices 130, 140 and 150.

The system 100 may also comprise a monitor 160 capable of monitoring at least one effect of testing the hot-pluggable peripheral hardware device 130 using the hot-pluggable interface (HPI) test fixture 120 inserted between the computer system 110 and the hot-pluggable peripheral hardware device 130. The monitor 160 may comprise software running inside the computer system 110 and may receive monitoring signals from the hot-pluggable interface (HPI) test fixture 120 via the bus 115. Similarly, in various alternative embodiments, the monitor 160 is capable of monitoring at least one effect of testing the chain of the hot-pluggable peripheral hardware devices 130, 140 and 150.

In various illustrative embodiments, the monitor 160 may allow the computer system 110 to verify the enumeration of each of the hot-pluggable peripheral hardware devices 130, 140 and/or 150 in the chain each time the hot-pluggable interface (HPI) test fixture 120 cycles (hot plugs). This check is capable of detecting errors such as any double enumeration of one of the hot-pluggable peripheral hardware devices 130, 140, and/or 150 in the chain, as well as any non-enumeration of each of the hot-pluggable peripheral hardware devices 130, 140 and/or 150 in the chain every time. Testing in this manner using the monitor 160 may help ensure robustness of the design, probe interactions with varying system loads and identify possible memory leaks that may lead to performance issues over time.

In various other alternative illustrative embodiments, the monitor 160 is capable of monitoring at least one effect of testing the plurality of the hot-pluggable peripheral hardware devices 130, 140 and 150. In still other alternative illustrative embodiments, the monitor 160 is capable of monitoring at least one effect of testing the chain of the plurality of the hot-pluggable peripheral hardware devices 130, 140 and 150.

Figure 2:
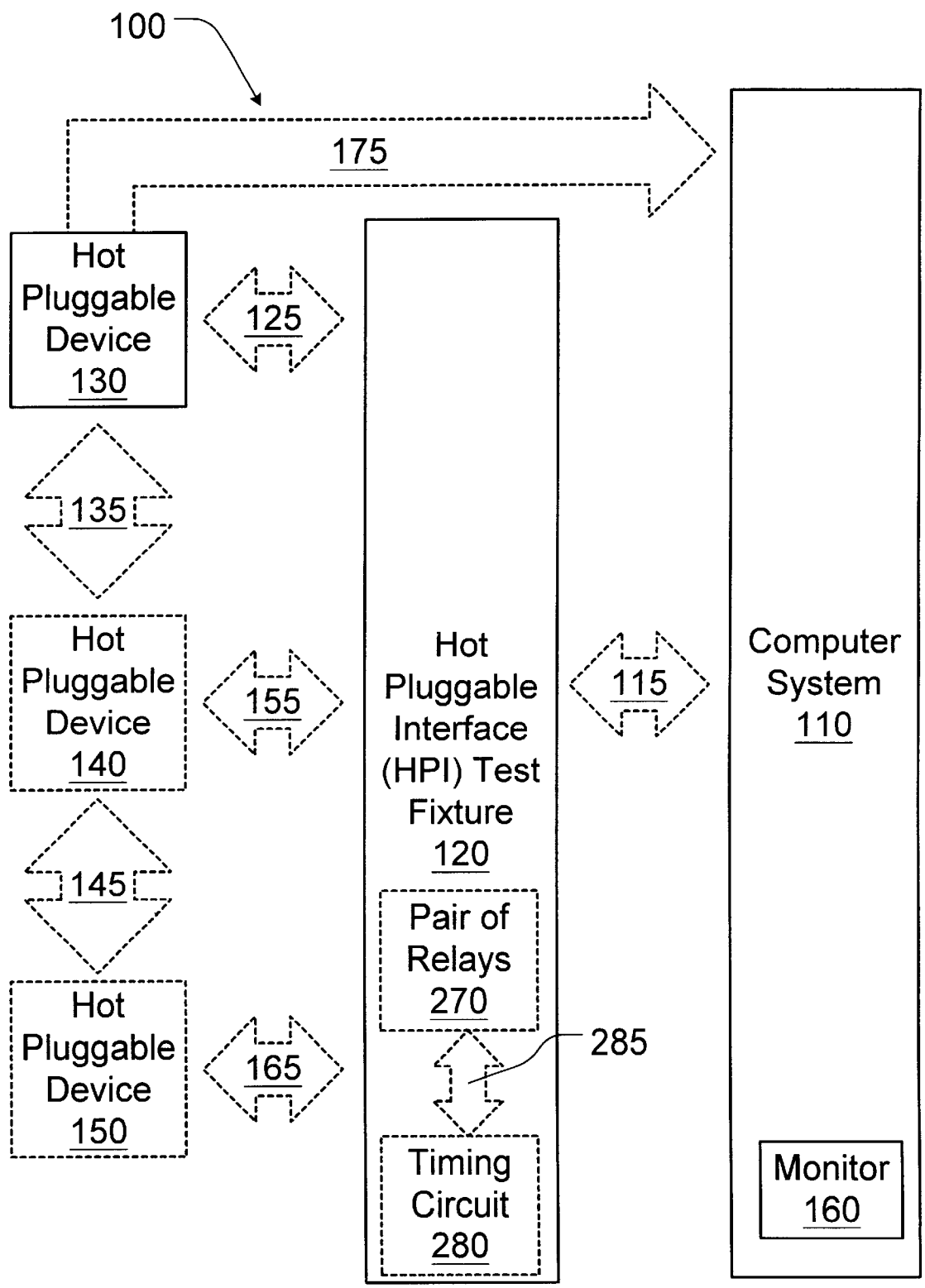

As shown in FIG. 2, the hot-pluggable interface (HPI) test fixture 120 may comprise a pair of relays 270 (shown in phantom) capable of interrupting power and data when the hot-pluggable interface (HPI) test fixture 120 is inserted between the computer system 110 and the hot-pluggable peripheral hardware device 130 and/or the chain of the hot-pluggable peripheral hardware devices 130, 140 and 150 and/or the plurality of the hot-pluggable peripheral hardware devices 130, 140 and 150 and/or the chain of the plurality of the hot-pluggable peripheral hardware devices 130, 140 and 150. The hot-pluggable interface (HPI) test fixture 120 may also comprise a timing circuit 280 (shown in phantom) controlling a cycle time of the hot-pluggable interface (HPI) test fixture 120. In various alternative embodiments, the timing circuit 280 may control a cycle time of the pair of relays 270 of the hot-pluggable interface (HPI) test fixture 120.

Figure 3:
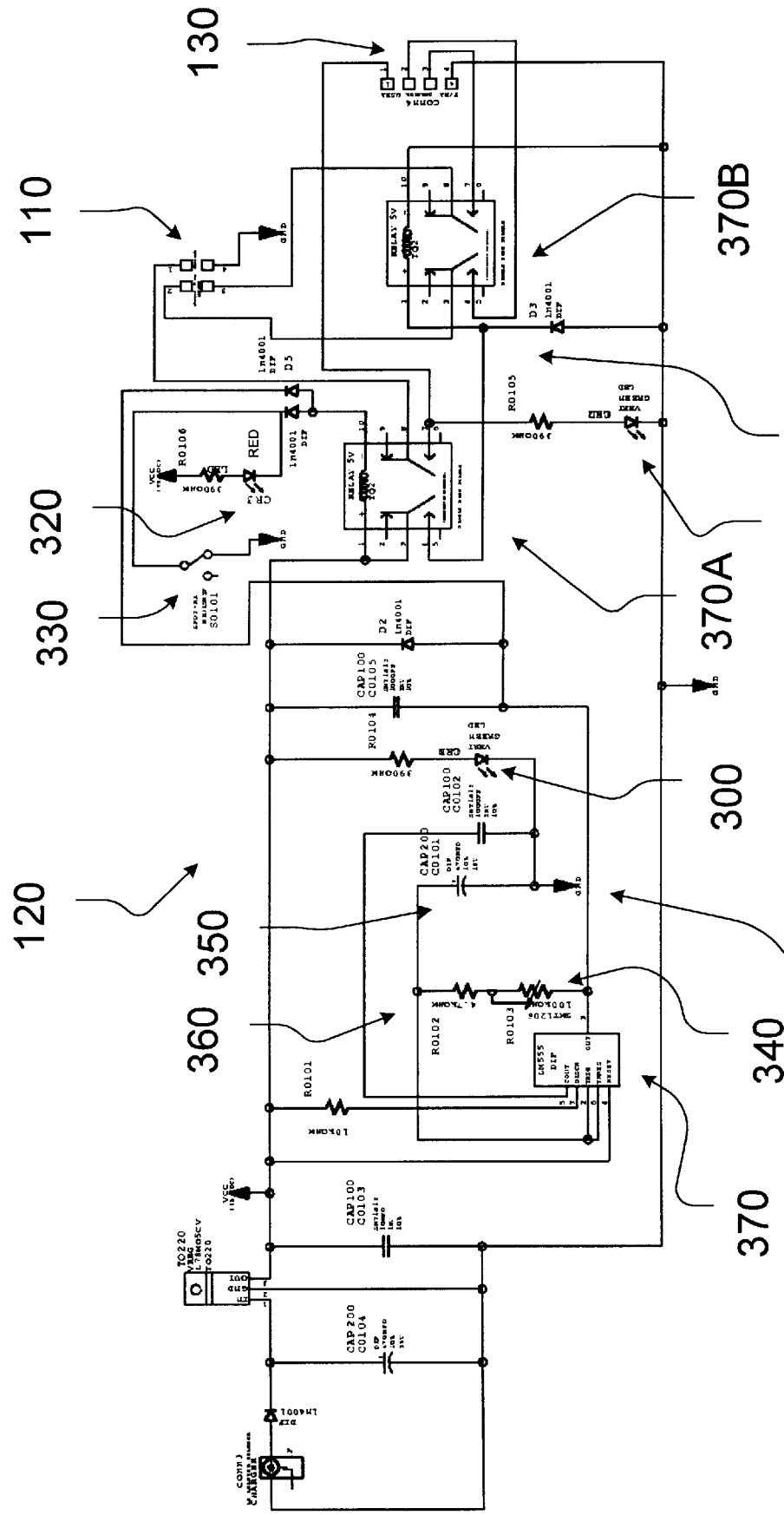

As shown in FIG. 3, in various illustrative embodiments, a Universal Serial Bus (USB) Hot Plug Interface (HPI) test fixture 120 may operate as follows. The Universal Serial Bus (USB) Hot Plug Interface (HPI) test fixture 120 may simulate the hot-plugging of Universal Serial Bus (USB) devices 130 and/or chains of Universal Serial Bus (USB) devices 130 when inserted between the computer system 110 and the Universal Serial Bus (USB) device(s) 130 under test. The various illustrative embodiments of the Universal Serial Bus (USB) Hot Plug Interface (HPI) test fixture 120 are operating system (OS)-independent and require no special setup.

As shown in FIG. 3, in various illustrative embodiments, a user has a "user friendly" interface including access to three light emitting diode (LED) indicators (for example, power LED 300 (green), cycle time LED 310 (green), and enable/disable LED 320 (red)), a switch 330 to enable/disable hot-plugging and a "speed" adjustment knob connected to variable resistor VRI 340 of the timing circuit 280 to vary the cycle time. The (green) power LED 300 signals to the user that "there is power" (for the Universal Serial Bus (USB) Hot Plug Interface (HPI) test fixture 120).

The (green) cycle time LED 310 signals to the user that "hot-plugging is going on" (the cycle time LED 310 is "on" when power from pin 1 of the Universal Serial Bus (USB) connector is passed through relay 370A and is "off" when power from pin 1 of the Universal Serial Bus (USB) connector is not passed through relay 370A). There is about 5 V supplied to pin 1 of the Universal Serial Bus (USB) connector from the computer system 110 and going out through pin 1 of the other Universal Serial Bus (USB) connector to the Universal Serial Bus (USB) device(s) 130 under test, at a "cost" of about 13 mA of the about 500 mA available. The (red) enable/disable LED 320 signals to the user that the Universal Serial Bus (USB) Hot Plug Interface (HPI) test fixture 120 is enabled (when the red enable/disable LED 320 is "off") or disabled (when the red enable/disable LED 320 is "on," the state shown in FIG. 3).

As shown in FIG. 3, the Universal Serial Bus (USB) Hot Plug Interface (HPI) test fixture 120 may have two primary functions. The first function may comprise a simple circuit allowing power and data to be interrupted via the pair of relays 270 when the Universal Serial Bus (USB) Hot Plug Interface (HPI) test fixture 120 is inserted between the computer system 110 and the Universal Serial Bus (USB) device(s) 130 under test, such as into a Universal Serial Bus (USB) device chain 130, 140 and 150. For example, pins 2 and 3 of the respective Universal Serial Bus (USB) connectors in the computer system 110 and the Universal Serial Bus (USB) device(s) 130 under test may be cross-connected to allow data (packets) to flow to and from the Universal Serial Bus (USB) device(s) 130 under test. The pair of relays 270 are configured such that power connections (pins 1 and 4 of the respective Universal Serial Bus (USB) connectors in the computer system 110 and the Universal Serial Bus (USB) device(s) 130 under test) are enabled prior to data connections (pins 2 and 3) to emulate the design of the Universal Serial Bus (USB) cable connectors.

The second function of the Universal Serial Bus (USB) Hot Plug Interface (HPI) test fixture 120 may comprise the timer circuit 280 that controls the cycle time of the pair of relays 270. The design of the timer circuit 280 may maintain about a 50% duty cycle regardless of the cycle time setting. For example, an LM555 timer 370 (such as is available from Radio Shack®) of the timer circuit 280 may provide a square wave output waveform at an output pin whose pulse duration corresponds to the cycle time setting. The cycle time may be determined by capacitance C1 350, resistance R1 360 and the variable resistance VR1 340. The resistance R1 360 is a value chosen to set the minimum (fastest) cycle time when the variable resistance VR1 340 is set to about zero ohms (0Ω). For example, the minimum (fastest) cycle time for proper enumeration of the Universal Serial Bus (USB) device(s) 130 under test may be set to about 4 seconds (t=RC; t=2.209 sec=RC=(4.7 kΩ)(470 μF)) providing about 2 seconds on and about 2 seconds off. For example, we have shown that a cycle time of about 0.2 seconds may well be too fast for hot-plugging (the system 100 may not be able to enumerate fast enough, for example), revealing potential hardware and/or software problems.

The variable resistance VR1 340 may be used to lengthen (slow down) the cycle time to accommodate long device chains and/or to slow the system 100 enumeration. For example, the variable resistance VR1 340 may use a 100 kΩ potentiometer that provides a maximum cycle time of about 98 seconds (about 94 seconds+about 4 seconds) when used with the above-described value of the resistance R1 360. Note that there may be some variance of the times given due to component tolerances (especially C1 350 that may have as much as about a 20% tolerance). Input voltage can vary in a range of between about 7–15V (DC), enabling the Universal Serial Bus (USB) Hot Plug Interface (HPI) test fixture 120 to be run via a 9 volt DC battery, a wall plug adapter, a SCSI power plug, a power tap to the internal power supply for the computer system 110, and the like, where the input power is regulated internally down to about 5 volts.

When the switch 330 is enabled (not shown) and the voltage from the square wave output waveform output from the LM555 timer 370 of the timer circuit 280 is "low," in about one half of the duty cycle, the LM555 timer 370 acts as a current sink, drawing current through the relay 370A of the pair of relays 270, inducing the single side stable relay 370A to switch from the "power interrupted" state shown in FIG. 3 to a "powered" state (not shown). In the powered state, "high" voltage from pin 1 of the Universal Serial Bus (USB) connector from the computer system 110 is connected to the (green) cycle time LED 310, empowering the (green) cycle time LED 310 to be "on," indicating that voltage is present on the Universal Serial Bus (USB). Additionally, pin 1 of the Universal Serial Bus (USB) connector from the computer system 110 is connected to (plugged into) pin 1 of the Universal Serial Bus (USB) device(s) 130 under test.

In the powered state of the single side stable relay 370A, supply voltage VCC (about +5 V) is passed through to relay 370B of the pair of relays 270, inducing the single side stable relay 370B to switch from the "data interrupted" state shown in FIG. 3 to a "data flowing" state (not shown). In the data flowing state, pins 2 and 3 of the Universal Serial Bus (USB) connector from the computer system 110 are connected to (plugged into) respective pins 2 and 3 of the Universal Serial Bus (USB) device(s) 130 under test.

When the switch 330 is enabled (not shown) and the voltage from the square wave output waveform output from the LM555 timer 370 of the timer circuit 280 is "high," in about one half of the duty cycle, the LM555 timer 370 does not act as a current sink, not drawing current through the relay 370A of the pair of relays 270, inducing the single side stable relay 370A to switch from the powered state to the power interrupted state shown in FIG. 3. In the power interrupted state, "high" voltage from pin 1 of the Universal Serial Bus (USB) connector from the computer system 110 is disconnected (unplugged) from the (green) cycle time LED 310, causing the (green) cycle time LED 310 to be "off," indicating that voltage is absent from the Universal Serial Bus (USB). Additionally, pin 1 of the Universal Serial Bus (USB) connector from the computer system 110 is disconnected (unplugged) from pin 1 of the Universal Serial Bus (USB) device(s) 130 under test.

In the power interrupted state of the single side stable relay 370A, supply voltage VCC (about +5 V) is not passed through to relay 370B of the pair of relays 270, inducing the single side stable relay 370B to switch from the data flowing state to the data interrupted state shown in FIG. 3. In the data interrupted state, pins 2 and 3 of the Universal Serial Bus (USB) connector from the computer system 110 are disconnected (unplugged) from respective pins 2 and 3 of the Universal Serial Bus (USB) device(s) 130 under test.

FIGS. 4–13 schematically illustrates particular embodiments of respective methods 400–1300 practiced in accordance with the present invention. FIGS. 1–3 schematically illustrate various devices and systems with which the methods 400–1300 may be practiced. For the sake of clarity, and to further an understanding of the invention, the methods 400–1300 shall be disclosed in the context of the various devices and systems shown in FIGS. 1–3. However, the present invention is not so limited and admits wide variation, as is discussed further below.

Figure 4:
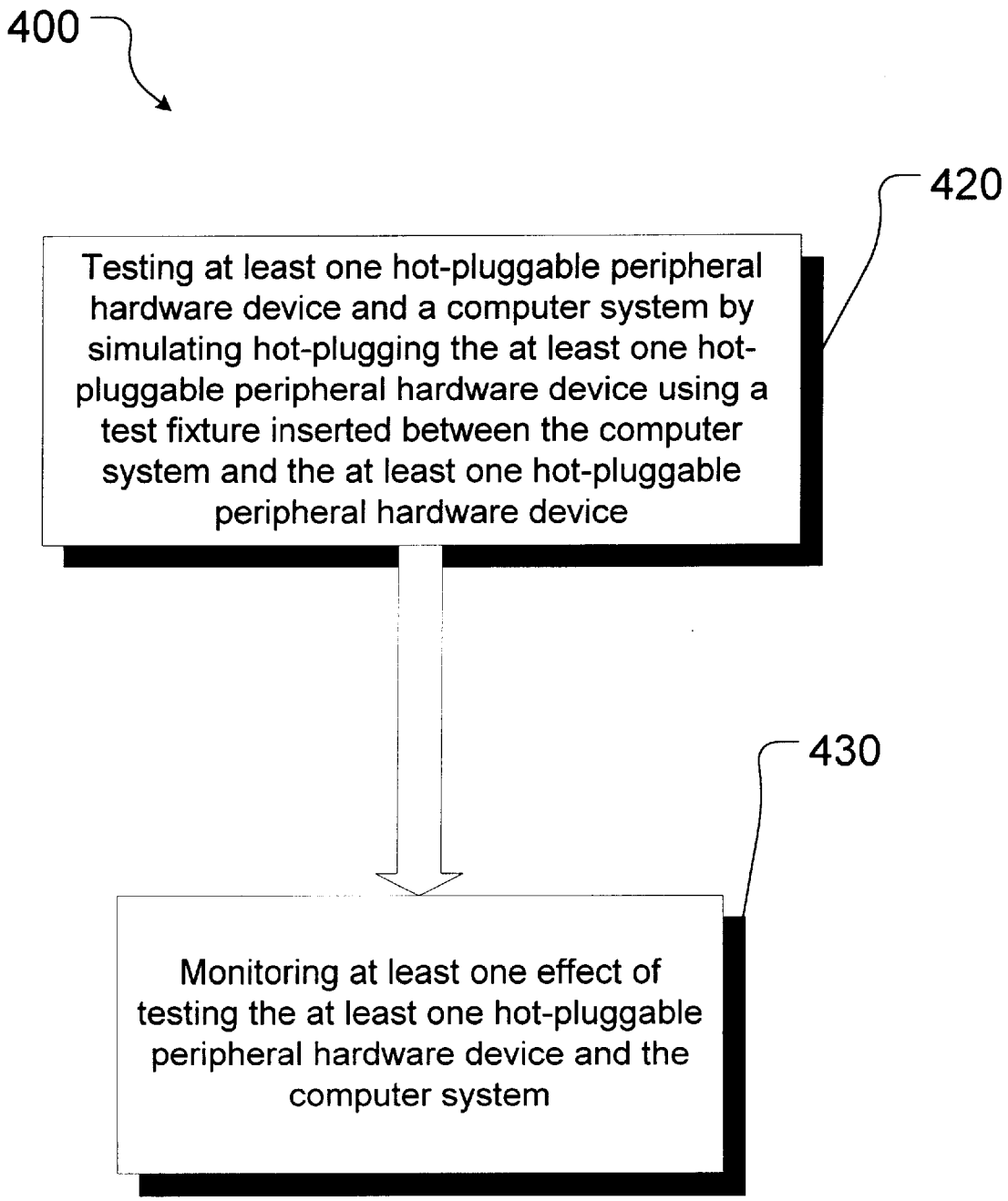
FIGS. 4–13 schematically illustrate various embodiments of a method practiced in accordance with the present invention.

As shown in FIG. 4, the method 400 begins, as set forth in box 420, by testing at least one hot-pluggable peripheral hardware device 130 by simulating hot-plugging the hot-pluggable peripheral hardware device 130 using the hot-pluggable interface (HPI) test fixture 120 inserted between the computer system 110 and the hot-pluggable peripheral hardware device 130. The method 400 proceeds by monitoring at least one effect of testing the hot-pluggable peripheral hardware device 130, as set forth in box 430.

Figure 5:
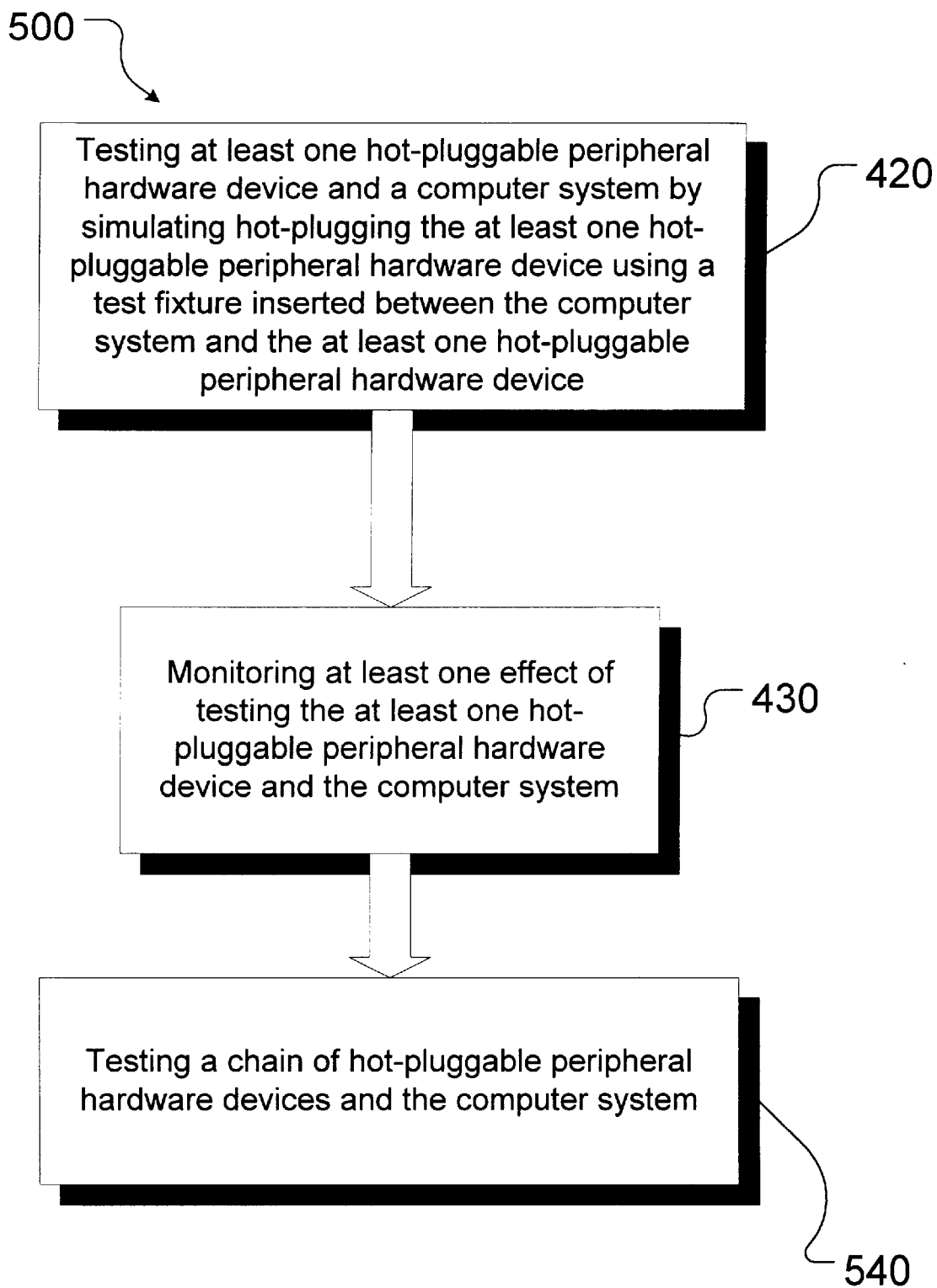

As shown in FIG. 5, the method 500 begins, as set forth in box 420, by testing at least one hot-pluggable peripheral hardware device 130 by simulating hot-plugging the hot-pluggable peripheral hardware device 130 using the hot-pluggable interface (HPI) test fixture 120 inserted between the computer system 110 and the hot-pluggable peripheral hardware device 130. The method 500 proceeds by monitoring at least one effect of testing the hot-pluggable peripheral hardware device 130, as set forth in box 430. The method 500 then proceeds, as set forth in box 540, by testing a chain of the hot-pluggable peripheral hardware devices 130, 140 and 150, as described above.

Figure 6:
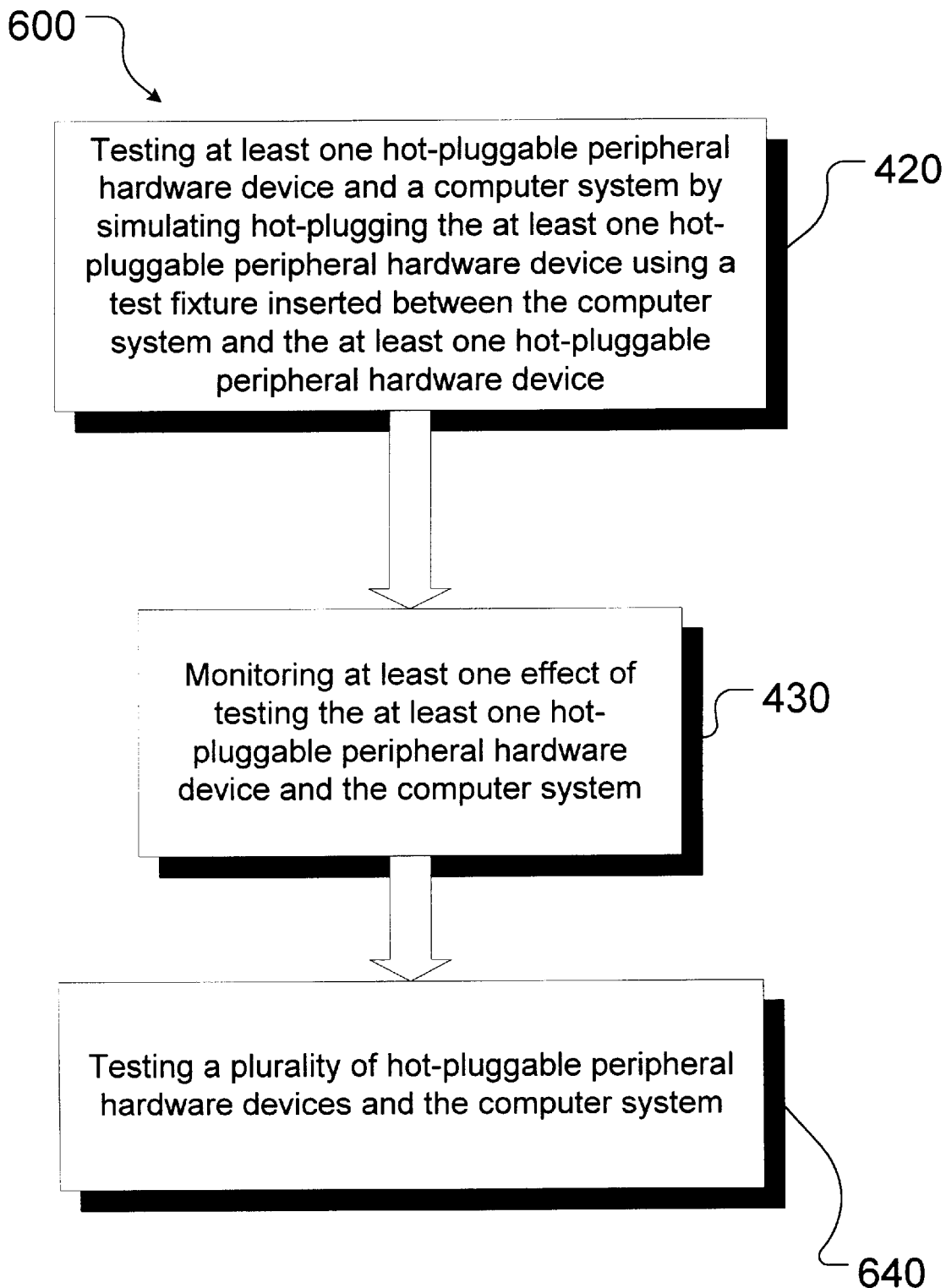

As shown in FIG. 6, the method 600 begins, as set forth in box 420, by testing at least one hot-pluggable peripheral hardware device 130 by simulating hot-plugging the hot-pluggable peripheral hardware device 130 using the hot-pluggable interface (HPI) test fixture 120 inserted between the computer system 110 and the hot-pluggable peripheral hardware device 130. The method 600 proceeds by monitoring at least one effect of testing the hot-pluggable peripheral hardware device 130, as set forth in box 430. The method 600 then proceeds, as set forth in box 640, by testing a plurality of the hot-pluggable peripheral hardware devices 130, 140 and 150, as described above.

Figure 7:
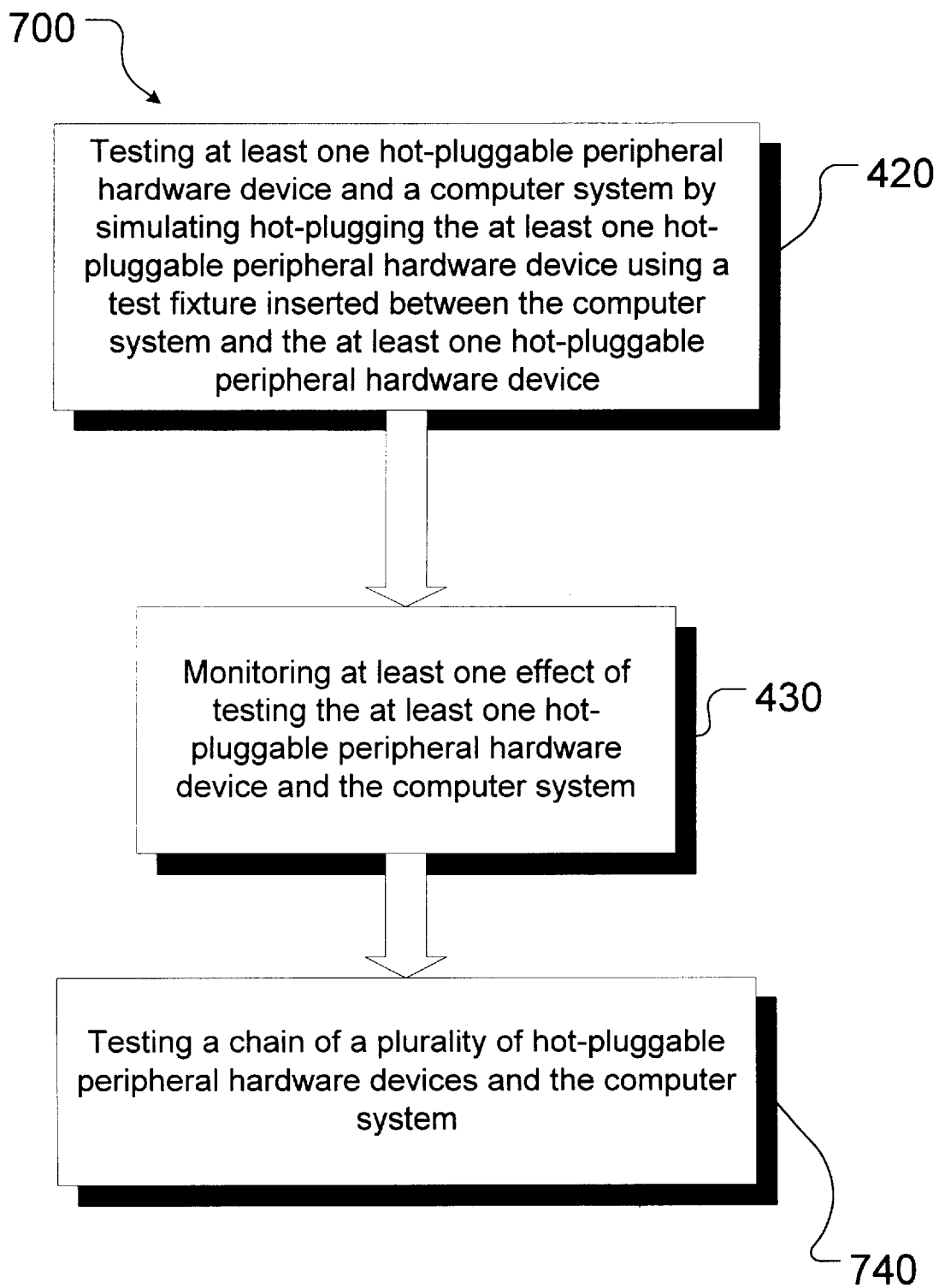

As shown in FIG. 7, the method 700 begins, as set forth in box 420, by testing at least one hot-pluggable peripheral hardware device 130 by simulating hot-plugging the hot-pluggable peripheral hardware device 130 using the hot-pluggable interface (HPI) test fixture 120 inserted between the computer system 110 and the hot-pluggable peripheral hardware device 130. The method 700 proceeds by monitoring at least one effect of testing the hot-pluggable peripheral hardware device 130, as set forth in box 430. The method 700 then proceeds, as set forth in box 740, by testing a chain of the plurality of the hot-pluggable peripheral hardware devices 130, 140 and 150, as described above.

Figure 8:
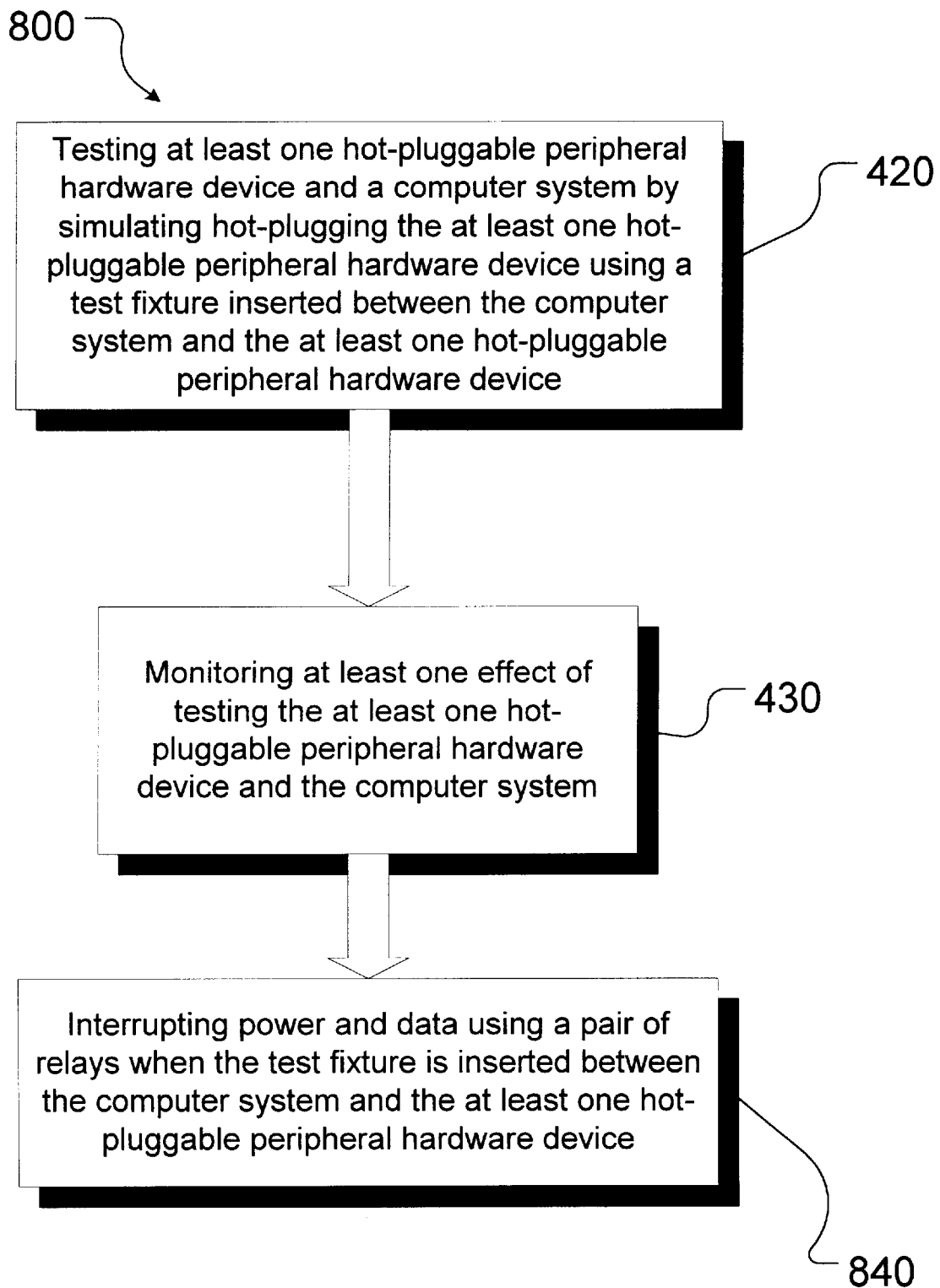

As shown in FIG. 8, the method 800 begins, as set forth in box 420, by testing at least one hot-pluggable peripheral hardware device 130 by simulating hot-plugging the hot-pluggable peripheral hardware device 130 using the hot-pluggable interface (HPI) test fixture 120 inserted between the computer system 110 and the hot-pluggable peripheral hardware device 130. The method 800 proceeds by monitoring at least one effect of testing the hot-pluggable peripheral hardware device 130, as set forth in box 430. The method 800 then proceeds, as set forth in box 840, by interrupting power and data using a pair of relays 270 when the hot-pluggable interface (HPI) test fixture 120 is inserted between the computer system 110 and the hot-pluggable peripheral hardware device 130, as described above.

Figure 9:
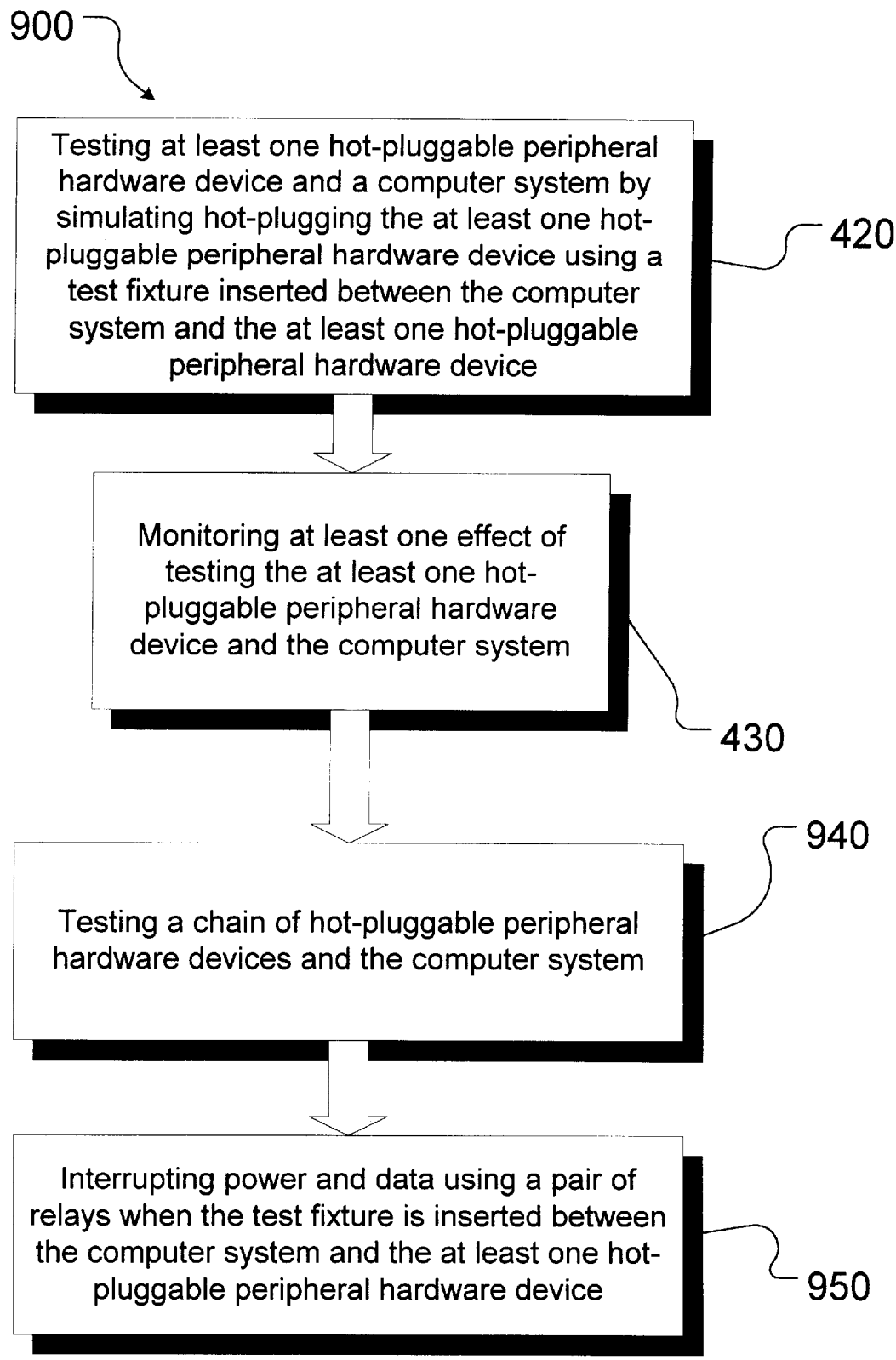

As shown in FIG. 9, the method 900 begins, as set forth in box 420, by testing at least one hot-pluggable peripheral hardware device 130 by simulating hot-plugging the hot-pluggable peripheral hardware device 130 using the hot-pluggable interface (HPI) test fixture 120 inserted between the computer system 110 and the hot-pluggable peripheral hardware device 130. The method 900 proceeds by monitoring at least one effect of testing the hot-pluggable peripheral hardware device 130, as set forth in box 430. The method 900 then proceeds, as set forth in box 940, by testing a chain of the hot-pluggable peripheral hardware devices 130, 140 and 150, as described above. The method 900 lastly proceeds, as set forth in box 950, by interrupting power and data using a pair of relays 270 when the hot-pluggable interface (HPI) test fixture 120 is inserted between the computer system 110 and the chain of the hot-pluggable peripheral hardware devices 130, 140 and 150, as described above.

Figure 10:
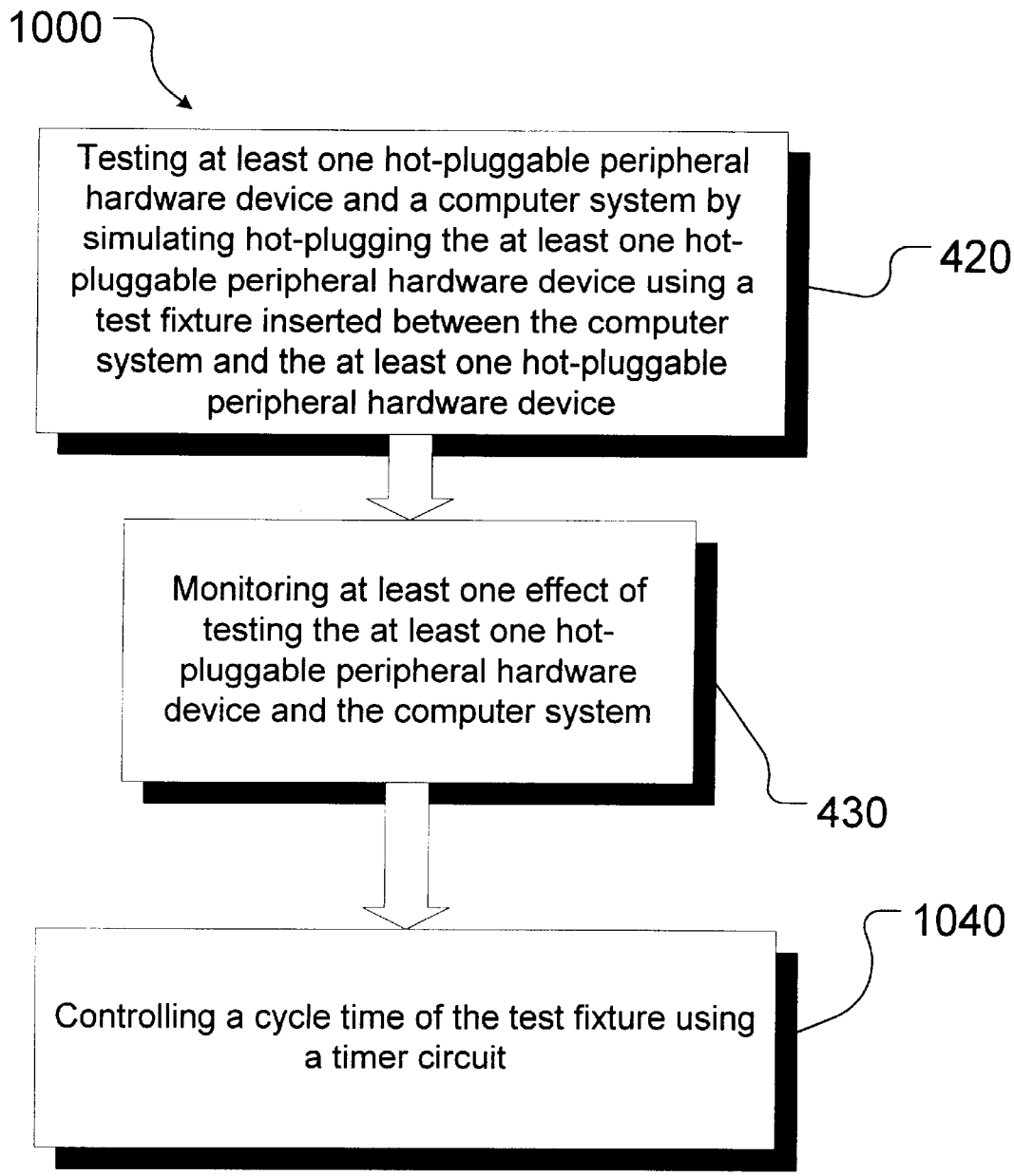

As shown in FIG. 10, the method 1000 begins, as set forth in box 420, by testing at least one hot-pluggable peripheral hardware device 130 by simulating hot-plugging the hot-pluggable peripheral hardware device 130 using the hot-pluggable interface (HPI) test fixture 120 inserted between the computer system 110 and the hot-pluggable peripheral hardware device 130. The method 1000 proceeds by monitoring at least one effect of testing the hot-pluggable peripheral hardware device 130, as set forth in box 430. The method 1000 then proceeds, as set forth in box 1040, by controlling a cycle time of the hot-pluggable interface (HPI) test fixture 120 using a timer circuit 280, as described above.

Figure 11:
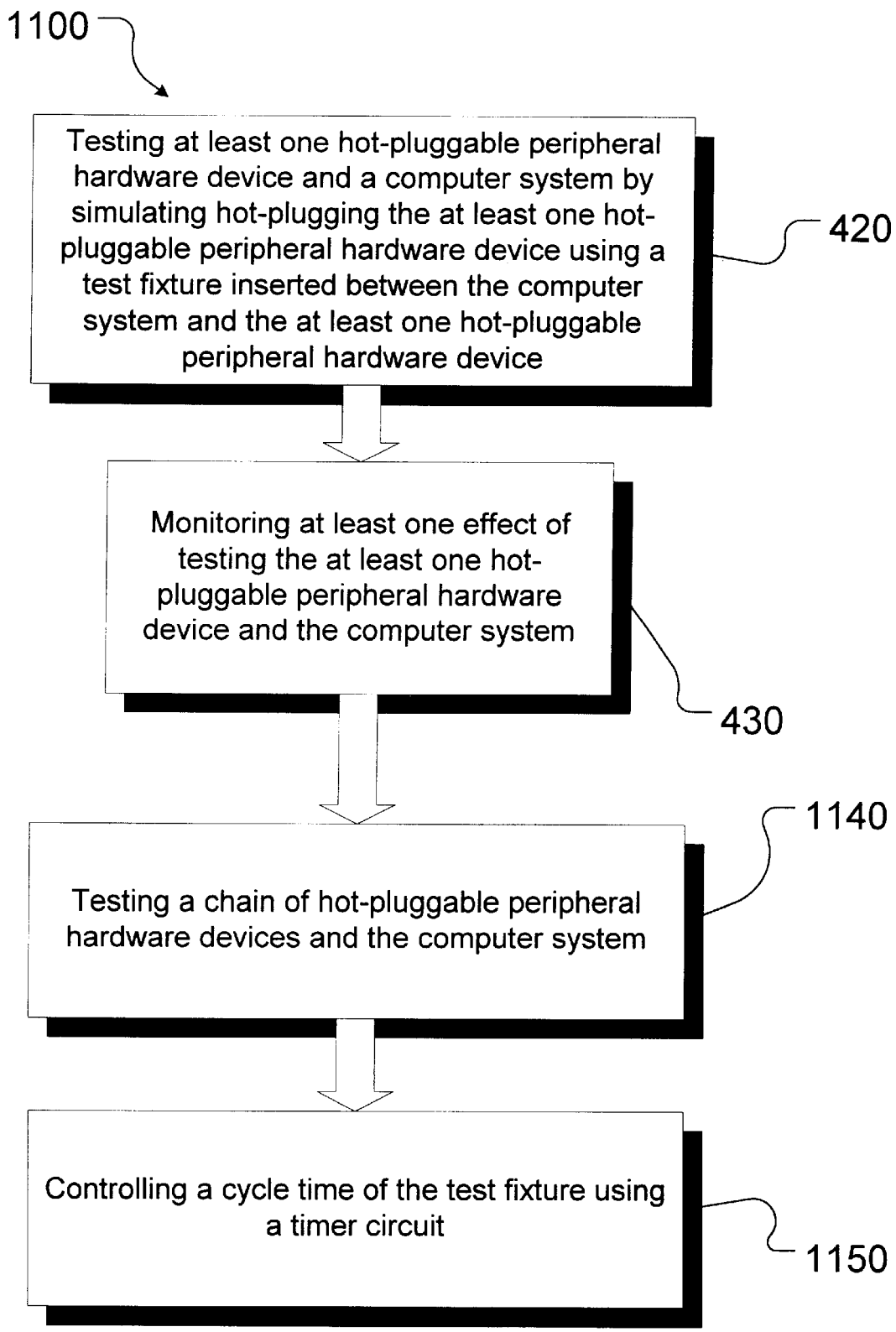

As shown in FIG. 11, the method 1100 begins, as set forth in box 420, by testing at least one hot-pluggable peripheral hardware device 130 by simulating hot-plugging the hot-pluggable peripheral hardware device 130 using the hot-pluggable interface (HPI) test fixture 120 inserted between the computer system 110 and the hot-pluggable peripheral hardware device 130. The method 1100 proceeds by monitoring at least one effect of testing the hot-pluggable peripheral hardware device 130, as set forth in box 430. The method 1100 then proceeds, as set forth in box 1140, by testing a chain of the hot-pluggable peripheral hardware devices 130, 140 and 150, as described above. The method 1100 lastly proceeds, as set forth in box 1150, by controlling a cycle time of the hot-pluggable interface (HPI) test fixture 120 using a timer circuit 280, as described above.

Figure 12:
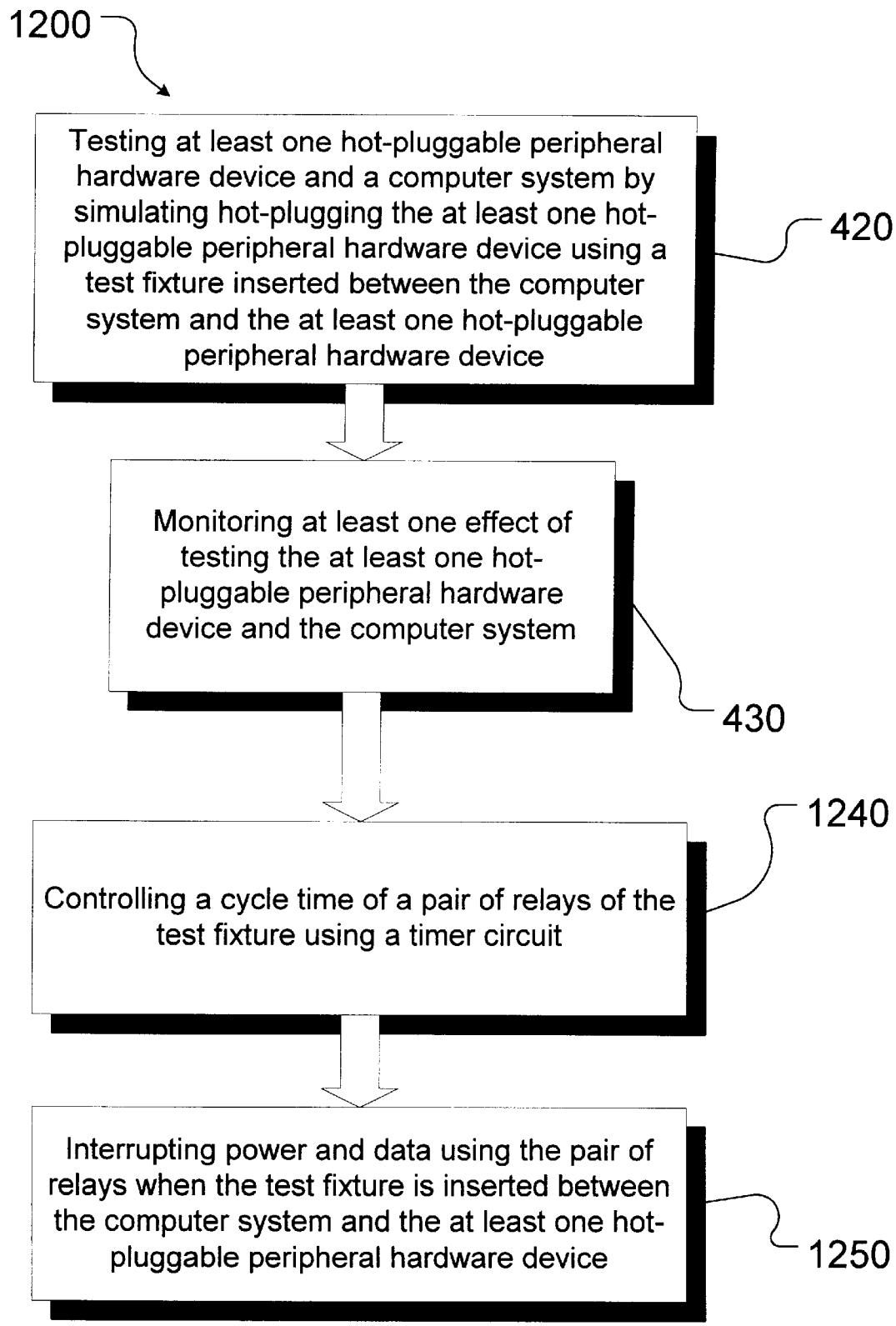

As shown in FIG. 12, the method 1200 begins, as set forth in box 420, by testing at least one hot-pluggable peripheral hardware device 130 by simulating hot-plugging the hot-pluggable peripheral hardware device 130 using the hot-pluggable interface (HPI) test fixture 120 inserted between the computer system 110 and the hot-pluggable peripheral hardware device 130. The method 1200 proceeds by monitoring at least one effect of testing the hot-pluggable peripheral hardware device 130, as set forth in box 430. The method 1200 then proceeds, as set forth in box 1240, by controlling a cycle time of a pair of relays 270 of the hot-pluggable interface (HPI) test fixture 120 using a timer circuit 280, as described above. The method 1200 lastly proceeds, as set forth in box 1250, by interrupting power and data using the pair of relays 270 when the hot-pluggable interface (HPI) test fixture 120 is inserted between the computer system 110 and the hot-pluggable peripheral hardware device 130, as described above.

Figure 13:
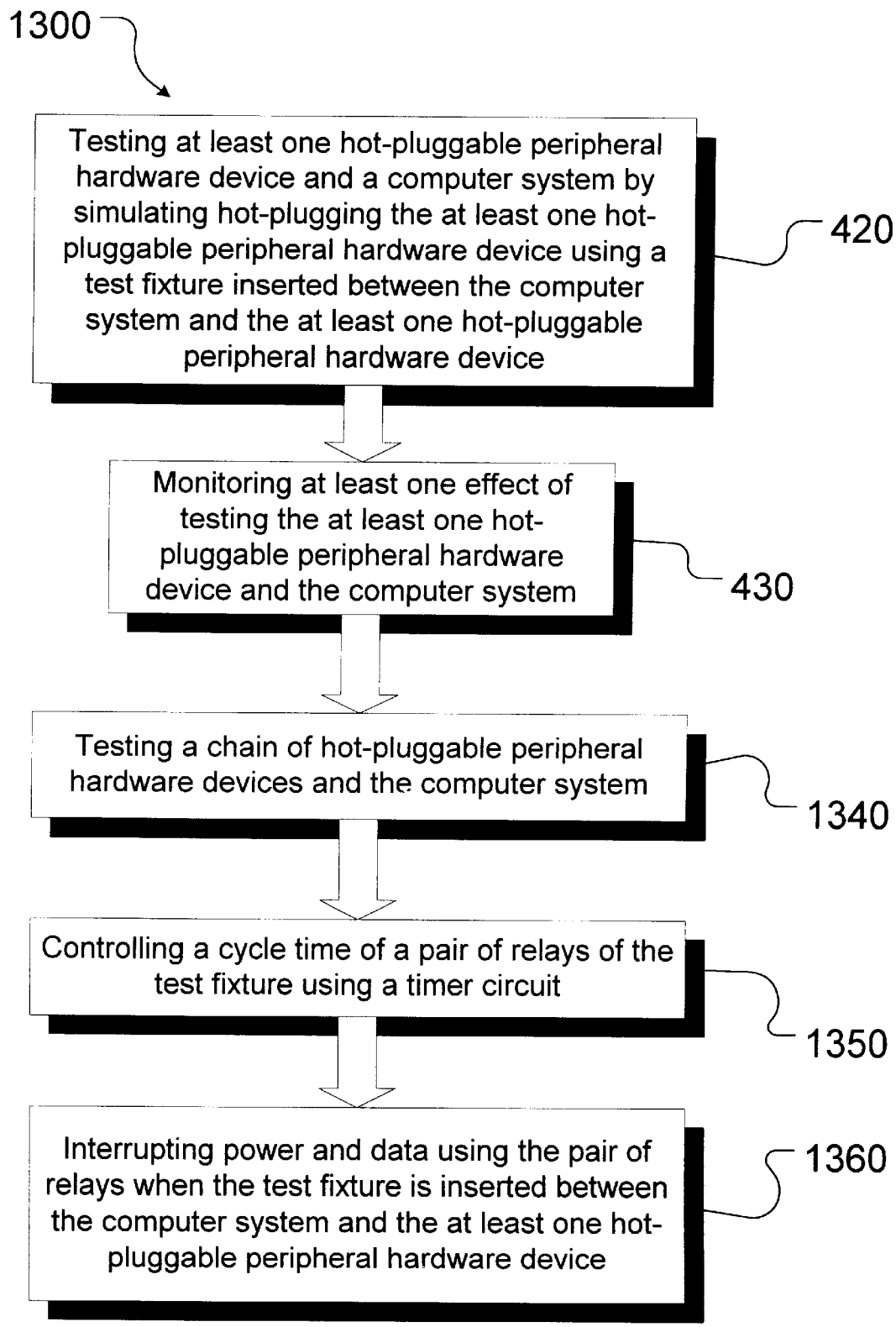

As shown in FIG. 13, the method 1300 begins, as set forth in box 420, by testing at least one hot-pluggable peripheral hardware device 130 by simulating hot-plugging the hot-pluggable peripheral hardware device 130 using the hot-pluggable interface (HPI) test fixture 120 inserted between the computer system 110 and the hot-pluggable peripheral hardware device 130. The method 1300 proceeds by monitoring at least one effect of testing the hot-pluggable peripheral hardware device 130, as set forth in box 430. The method 1300 then proceeds, as set forth in box 1340, by testing a chain of the hot-pluggable peripheral hardware devices 130, 140 and 150, as described above. The method 1300 then proceeds, as set forth in box 1350, by controlling a cycle time of a pair of relays 270 of the hot-pluggable interface (HPI) test fixture 120 using a timer circuit 280, as described above. The method 1300 lastly proceeds, as set forth in box 1360, by interrupting power and data using the pair of relays 270 when the hot-pluggable interface (HPI) test fixture 120 is inserted between the computer system 110 and the chain of the hot-pluggable peripheral hardware devices 130, 140 and 150, as described above.

Any of the above-disclosed embodiments of a method and a device according to the present invention enables hot-pluggable peripheral hardware device(s) under test effectively to be plugged, unplugged and replugged repeatedly, attempting to discover software problems such as memory leaks, failed and/or intermittent enumerations of the bus, interactions with problematic devices and the like. Additionally, any of the above-disclosed embodiments of a method and a device according to the present invention enables testing and monitoring of hot-pluggable peripheral hardware device(s) under test simply, cheaply, robustly and reliably, without human errors that limit the usefulness, robustness and reliability of manual testing. For example, such testing and monitoring of hot-pluggable peripheral hardware device(s) under test may be performed at sufficiently regular intervals and/or may be able to be performed for extended periods of time. Moreover, any of the above-disclosed embodiments of a method and a device according to the present invention may provide for the plugging and unplugging to be performed at easily variable intervals, the power connections of the Universal Serial Bus (USB) device (or a string or chain of such devices) to be enabled prior to the data connections of the Universal Serial Bus (USB) device (or a string or chain of such devices) to emulate the design of the Universal Serial Bus (USB) cable connectors and/or automated monitoring of the plugging and unplugging of the Universal Serial Bus (USB) device (or a string or chain of such devices).

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a–b") disclosed herein is to be understood as referring to the power set (the set of all subsets) of the respective range of values, in the sense of Georg Cantor. Accordingly, the protection sought herein is as set forth in the claims below.

What is claimed:

1. A method comprising:
   testing at least one hot-pluggable peripheral hardware device and a computer system by simulating hot-plugging the at least one hot-pluggable peripheral hardware device using a test fixture inserted between the computer system and the at least one hot-pluggable peripheral hardware device; and
   monitoring at least one effect of testing the at least one hot-pluggable peripheral hardware device and the computer system.

2. The method of claim 1, wherein testing the at least one hot-pluggable peripheral hardware device and the computer system comprises testing a chain of hot-pluggable peripheral hardware devices and the computer system.

3. The method of claim 2, wherein simulating hot-plugging the at least one hot-pluggable peripheral hardware device using the test fixture comprises interrupting power and data using a pair of relays when the test fixture is inserted between the computer system and the at least one hot-pluggable peripheral hardware device.

4. The method of claim 3, wherein simulating hot-plugging the at least one hot-pluggable peripheral hardware device using the test fixture comprises controlling a cycle time of the pair of relays of the test fixture using a timer circuit.

5. The method of claim 2, wherein simulating hot-plugging the at least one hot-pluggable peripheral hardware device using the test fixture comprises controlling a cycle time of the test fixture using a timer circuit.

6. The method of claim 1, wherein testing the at least one hot-pluggable peripheral hardware device and the computer system comprises testing a plurality of hot-pluggable peripheral hardware devices and the computer system.

7. The method of claim 6, wherein testing the plurality of hot-pluggable peripheral hardware devices and the computer system comprises testing a chain of the plurality of hot-pluggable peripheral hardware devices and the computer system.

8. The method of claim 1, wherein simulating hot-plugging the at least one hot-pluggable peripheral hardware device using the test fixture comprises interrupting power and data using a pair of relays when the test fixture is inserted between the computer system and the at least one hot-pluggable peripheral hardware device.

9. The method of claim 8, wherein simulating hot-plugging the at least one hot-pluggable peripheral hardware device using the test fixture comprises controlling a cycle time of the pair of relays of the test fixture using a timer circuit.

10. The method of claim 1, wherein simulating hot-plugging the at least one hot-pluggable peripheral hardware device using the test fixture comprises controlling a cycle time of the test fixture using a timer circuit.

11. A system comprising:
a computer system;
at least one hot-pluggable peripheral hardware device;
a test fixture capable of testing the at least one hot-pluggable peripheral hardware device and the computer system by simulating hot-plugging the at least one hot-pluggable peripheral hardware device using the test fixture inserted between the computer system and the at least one hot-pluggable peripheral hardware device; and
a monitor capable of monitoring at least one effect of testing the at least one hot-pluggable peripheral hardware device and the computer system.

12. The system of claim 11, wherein the at least one hot-pluggable peripheral hardware device comprises a chain of hot-pluggable peripheral hardware devices.

13. The system of claim 12, wherein the test fixture capable of testing the at least one hot-pluggable peripheral hardware device and the computer system by simulating hot-plugging the at least one hot-pluggable peripheral hardware device comprises a pair of relays capable of interrupting power and data when the test fixture is inserted between the computer system and the at least one hot-pluggable peripheral hardware device.

14. The system of claim 13, wherein the test fixture capable of testing the at least one hot-pluggable peripheral hardware device and the computer system by simulating hot-plugging the at least one hot-pluggable peripheral hardware device comprises a timer circuit controlling a cycle time of the pair of relays of the test fixture.

15. The system of claim 12, wherein the test fixture capable of testing the at least one hot-pluggable peripheral hardware device and the computer system by simulating hot-plugging the at least one hot-pluggable peripheral hardware device comprises a timer circuit controlling a cycle time of the test fixture.

16. The system of claim 11, wherein the at least one hot-pluggable peripheral hardware device comprises a plurality of hot-pluggable peripheral hardware devices.

17. The system of claim 16, wherein the plurality of hot-pluggable peripheral hardware devices comprises a chain of the plurality of hot-pluggable peripheral hardware devices.

18. The system of claim 11, wherein the test fixture capable of testing the at least one hot-pluggable peripheral hardware device and the computer system by simulating hot-plugging the at least one hot-pluggable peripheral hardware device comprises a pair of relays capable of interrupting power and data when the test fixture is inserted between the computer system and the at least one hot-pluggable peripheral hardware device.

19. The system of claim 18, wherein the test fixture capable of testing the at least one hot-pluggable peripheral hardware device and the computer system by simulating hot-plugging the at least one hot-pluggable peripheral hardware device comprises a timer circuit controlling a cycle time of the pair of relays of the test fixture.

20. The system of claim 11, wherein the test fixture capable of testing the at least one hot-pluggable peripheral hardware device and the computer system by simulating hot-plugging the at least one hot-pluggable peripheral hardware device comprises a timer circuit controlling a cycle time of the test fixture.

21. A device comprising:
means for testing at least one hot-pluggable peripheral hardware device and a computer system by simulating hot-plugging the at least one hot-pluggable peripheral hardware device using a test fixture inserted between the computer system and the at least one hot-pluggable peripheral hardware device; and
means for monitoring at least one effect of testing the at least one hot-pluggable peripheral hardware device and the computer system.

22. The device of claim 21, wherein the means for testing the at least one hot-pluggable peripheral hardware device and the computer system comprises means for testing a chain of hot-pluggable peripheral hardware devices and the computer system.

23. The device of claim 22, wherein the means for testing the at least one hot-pluggable peripheral hardware device and the computer system by simulating hot-plugging the at least one hot-pluggable peripheral hardware device using the test fixture comprises interrupting power and data using a pair of relays when the test fixture is inserted between the computer system and the at least one hot-pluggable peripheral hardware device.

24. The device of claim 23, wherein the means for testing the at least one hot-pluggable peripheral hardware device and the computer system by simulating hot-plugging the at least one hot-pluggable peripheral hardware device using the test fixture comprises controlling a cycle time of the pair of relays of the test fixture using a timer circuit.

25. The device of claim 22, wherein the means for testing the at least one hot-pluggable peripheral hardware device and the computer system by simulating hot-plugging the at least one hot-pluggable peripheral hardware device using the test fixture comprises controlling a cycle time of the test fixture using a timer circuit.

26. The device of claim 21, wherein the means for testing the at least one hot-pluggable peripheral hardware device and the computer system comprises means for testing a plurality of hot-pluggable peripheral hardware devices and the computer system.

27. The device of claim 26, wherein the means for testing the plurality of hot-pluggable peripheral hardware devices and the computer system comprises means for testing a chain of the plurality of hot-pluggable peripheral hardware devices and the computer system.

28. The device of claim 21, wherein the means for testing the at least one hot-pluggable peripheral hardware device and the computer system by simulating hot-plugging the at least one hot-pluggable peripheral hardware device using the test fixture comprises interrupting power and data using a pair of relays when the test fixture is inserted between the computer system and the at least one hot-pluggable peripheral hardware device.

29. The device of claim 28, wherein the means for testing the at least one hot-pluggable peripheral hardware device and the computer system by simulating hot-plugging the at least one hot-pluggable peripheral hardware device using the test fixture comprises controlling a cycle time of the pair of relays of the test fixture using a timer circuit.

30. The device of claim 21, wherein the means for testing the at least one hot-pluggable peripheral hardware device and the computer system by simulating hot-plugging the at least one hot-pluggable peripheral hardware device using the test fixture comprises controlling a cycle time of the test fixture using a timer circuit.

* * * * *